United States Patent [19]

Dunn et al.

[11] Patent Number: 4,638,490

[45] Date of Patent: Jan. 20, 1987

[54] MELTING FURNACES

[75] Inventors: Charles S. Dunn, Pataskala; Mark A. Propster; Charles M. Hohman, both of Granville, all of Ohio

[73] Assignee: Owens-Corning Fiberglas Corporation, Toledo, Ohio

[21] Appl. No.: 658,018

[22] Filed: Oct. 5, 1984

[51] Int. Cl.⁴ .............................................. C03B 5/027
[52] U.S. Cl. ........................................ 373/35; 373/40; 373/41
[58] Field of Search ................... 373/27, 29, 36, 39, 373/40, 41, 30, 33, 35

[56] References Cited

U.S. PATENT DOCUMENTS 3,852,509 12/1974 Rutledge et al. ..................... 373/41
3,961,126 6/1976 Maddux ................................. 373/40

Primary Examiner—Roy N. Envall, Jr.
Attorney, Agent, or Firm—Ronald C. Hudgens; Patrick P. Pacella

[57] ABSTRACT

A melting furnace is disclosed which heats by joule effect to supply molten material of uniform temperature at the floor of the melter. During formation of molten material, an essentially isothermal condition across a given horizontal plane of the body of molten material is established. Spaced apart opposed electrodes and controlled current flow establish these uniform temperatures and allow molten material to be formed directly from the melter without further processing.

4 Claims, 3 Drawing Figures

MELTING FURNACES

TECHNICAL FIELD

This invention relates to the production of molten material and, more particularly, to a vertical melter for making molten glass with electric melting techniques.

BACKGROUND ART

In a recent development of ours, we developed a joule effect electric melter aimed primarily at processes where consistency in properties like temperature and viscosity in a supply of molten material, such as molten glass, are important in forming a quality product. The melter is a shallow vertical melter that supplies molten material of uniform temperature to one or more product forming outlets located at the bottom of the melter. During operation, the melter establishes within the molten material of the melter a horizontal heating zone of substantially uniform temperature condition throughout.

When melting glass from a layer of raw batch formed on the surface of the molten body, molten glass in the melter rises to the molten glass/raw batch interface as a result of thermal currents caused by the heating zone. Molten glass moves across the upper surface of the molten body where it can easily degas. The thermal currents effect mixing and fining of the glass in such a way to promote uniform temperature of the molten glass in horizontal layers throughout the molten body. The result is a supply of glass of desired uniform temperature delivered at the entrance to the melter outlets.

The zone of the uniformly heated material is established in preferred form by operation of joule effect electrodes arranged in generally opposed spaced apart relationship. In a more specific sense, the electrodes are disposed in two groups, each in generally horizontal and laterally spaced apart relationship; the electrodes in each group are also arranged in opposed spaced apart relation. Means for supplying electrical current to the electrodes matches electrical current in each electrode with the particular spaced apart relationship of the electrodes to form the heating zone of substantially uniform temperature and thereby mix and move the molten glass to supply glass of uniform temperature to the entrance outlets of the melter.

The electrode power supply circuits of our recent development each equalize the flow of current through the individual electrodes disposed within the molten glass. The equalization of the flow of current in each electrode within the glass is produced by applying electrical power for driving either the electrodes directly or indirectly through additional cascaded current splitting inductors through the center tap of an inductor having ends which are respectfully coupled either directly to electrodes or to the center taps of the additional cascaded current splitting inductors. This recent development uses current splitters to equalize the flow of current through the individual electrodes. As a result, the only way to bias the temperature in any horizontal plane is by moving the electrodes in and out of the melter. This can be very difficult, especially with a high liquidus glass.

DISCLOSURE OF INVENTION

The invention uses a modified electrical firing configuration to allow individual pairs of electrodes to be independently controlled. This allows the melt temperature of the glass entering the bushing well to be adjusted to provide glass to the bushing with a heat pattern which will optimize bushing performance. A separate transformer is used for each pair of electrodes to assure that current flows directly across the melter to its opposing pair. This eliminates the possibility of hot spots occurring because of changing current paths due to the negative temperature coefficient of resistivity of glass.

BEST MODE OF CARRYING OUT INVENTION

Figure 1:
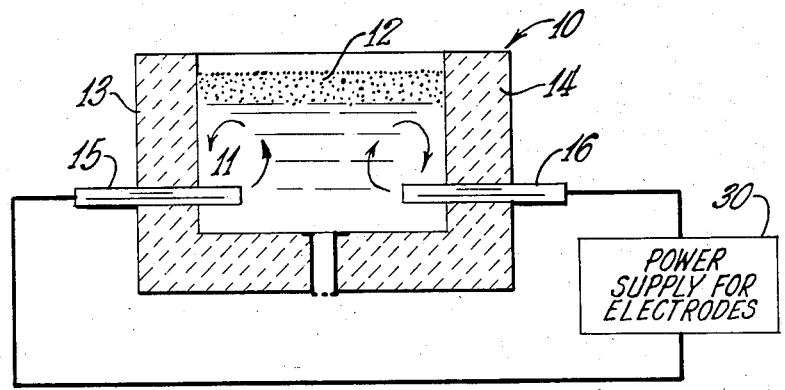
FIG. 1 shows a side view of a glass melter according to this invention.
Figure 2:
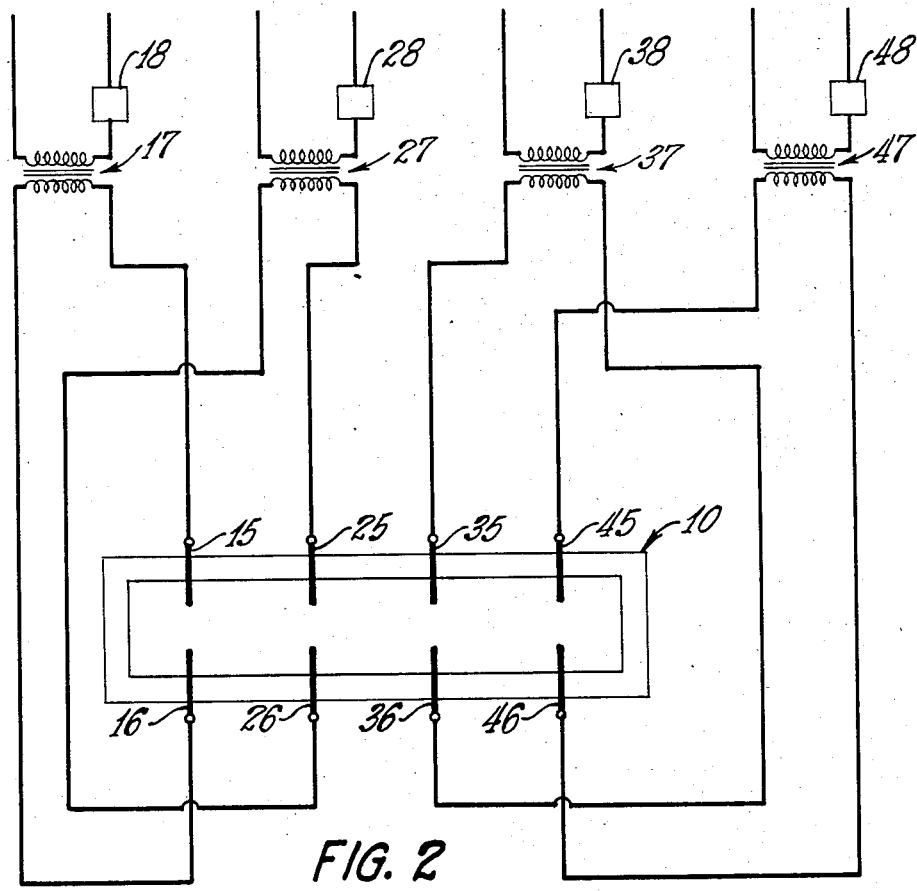
FIG. 2 shows a schematic of this invention illustrating the electrical firing configuration which allows individual pairs of electrodes to be independently controlled.

We will conveniently describe this invention by the structure disclosed in FIGS. 1 and 2. While this invention has been illustrated by this structure, it also may take a variety of other forms.

As shown in FIG. 1, melter 10 is made of refractory and holds a body of molten glass 11 covered by a blanket 12 of pulverant raw glass batch material. The raw batch material may be for wool glass, textile glass, bottle glass, flat glass, or basalt or the like. Extending through sidewalls 13 and 14 is at least one pair of opposed, movable electrodes 15 and 16. The sides and bottom of the melter are made from a suitable refractory material which can withstand the high temperature attendant with the melting of glass. The individual electrodes 15 and 16 are molybdenum. It should be understood that the embodiment of FIG. 1 is not limited to the use of two electrodes and that any number of electrodes greater than two may be used.

The means for controllably supplying electrical current to each pair of opposed electrodes allows the temperature of the molten glass entering the bushing well to be adjusted to provide glass to the bushing with a heat pattern which will optimize bushing performance.

Any type of forming apparatus may be employed with melter 10 such as a bottle machine, spinner for producing insulation or a textile type fiber forming bushing mounted in the bottom of melter 10. The combination of heating produced by joule effect in the vicinity of the interface of the individual electrodes 15 and 16 within the molten glass 11 permit the fibers to be drawn without requiring further processing to produce temperatures which permit glass fiber drawing.

Electrodes need not pass through the sidewalls of furnace 10 but instead enter the molten glass from above its top surface. Accordingly, a portion of each electrode is submerged in molten glass 11, and a portion of each electrode is exposed to the environment adjacent the raw batch/molten glass interface. Means must be located at this interface for preventing oxidation of the electrode. Typically, a cooling means such as a cooling jacket with circulating nitrogen or water, provides the needed protection. Generally, top-entering electrodes will be constructed in a knee/ankle configuration employing two elbows with a portion of electrode 16 submerged below molten glass 11.

While pairs of electrodes may be moved towards or away from each other depending upon furnace conditions, glass resistivity and refractory resistivity, the electrode firing configuration of this invention permits optimum heat patterns without electrode movement.

FIG. 2 illustrates the electrical firing configuration of this invention. The schematic shows 4 pairs of electrodes: 15 and 16; 25 and 26; 35 and 36; and 45 and 46. Each pair of electrodes is powered by its own resistance heating transformer 17, 27, 37 and 47, respectively. Each pair of electrodes also is controlled by SCR power controller 18, 28, 38 and 48, respectively. The SCR's provide an input to each transformer of the heating power supply to permit control of the amount of current being drawn by each pair of electrodes for resistance heating. Thus, a separate transformer is used for each pair of electrodes to assure current flow directly between each pair. This eliminates the possibility of hot spots occurring because of changing current paths due to changes in glass resistivity.

Figure 3:
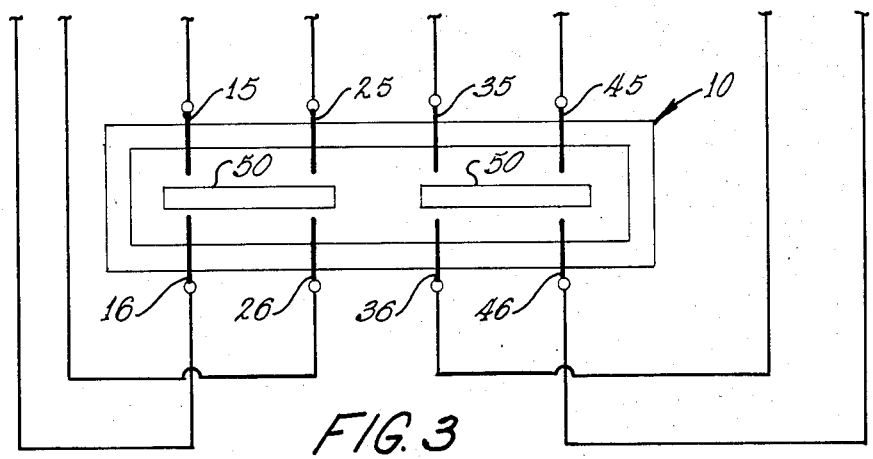
FIG. 3 is a cutaway of the schematic of FIG. 2 showing multiple openings in the floor of the melter.

FIG. 3 is a cutaway of FIG. 2 showing multiple openings 50 in the bottom of melter 10.

INDUSTRIAL APPLICABILITY

An electric furnace in accordance with this invention may be hung in position beneath a batch feed system. Four pairs of electrodes were employed in the melter. They extended through sidewalls and were arranged as pairs of opposed, parallel electrodes. The electrodes were movable and could penetrate into the furnace until the tips of opposed electrodes are only one inch apart. Production platinum bushings may be installed below the melter with refractory bushing blocks in place.

Generally, the temperature of the molten material at the bushing will be at least 300° F. lower than the temperature of the molten material at the batch interface. This difference may, however, be as high as 650° F. depending upon the type of material being melted and furnace conditions. On occasion, the difference may be less than 300° F. However, this condition would not be encountered often.

The bushing was a conventional textile bushing used to make continuous fibers. While E glass fibers and C glass fibers were produced, R glass or a basalt also could be made. Melter temperatures usually were above 2700° F. (1482° C.) and typically were about 2750° F. (1510° C.). Bushing temperatures usually were above 2100° F. (1149° C.) and typically were about 2200° F. (1204° C.).

Precautions of isolating the electrodes and grounding the power supply must be taken. Protecting the bushing and melter walls from short circuiting also must be provided. Otherwise an electrolytic effect will be established between the grounded molybdenum electrodes, the platinum bushing grounded through the refractory and the molten glass. This battery like-effect will cause premature failure of the melter, usually through corrosion of the platinum bushing. By applying a source of direct current to the bushing with one lead to the bushing and the other to ground, this effect can be eliminated. The anodic protection of forming means, such as bushings or feeders, for making glass fibers is accomplished by applying an anodic D.C. bias to a bushing which has been electrically grounded. This grounding can even occur through the refractory. While the anodic protection is described in terms of a grounded bushing, any portion of the melter, such as a thermocouple or electrode made of precious metal, may be grounded in a similar manner. Also, there must be a cathodic material somewhere in the vicinity of the bushing to complete the D.C. circuit. The molybdenum electrodes of the melter often may serve the purpose of completing the D.C. circuit and acting as the cathode.

One structure which may be used with this invention is spaced apart opposed electrodes located within a vessel wherein the electrodes consist of a first row of spaced apart electrodes and a second row of spaced apart electrodes, the second row being opposed to the first row and the electrodes from one row extending to terminate in spaced apart, generally aligned relationship with the electrodes extending from the other row. Adjacent electrodes in a row have a lateral distance between them, wherein the electrodes at the end of each row have a lateral distance between them and the adjacent interior surface that is one-half the lateral distance between adjacent electrodes in the row.

The distance between the electrodes and the forming means also is important because there must be enough heat loss so that the forming means, e.g., a bushing, will operate. The heat loss can be easily adjusted with the electrodes of this invention to conform to the throughput of the furnace. With the unit melter of this invention, there is no molten flow in the axial direction. The flow is vertical with more uniform glass temperature to the forming means.

The controlled current flow of this invention provides molten material of optimum temperature to the product forming outlets located at the bottom of the melter.

The following example presents data obtained from actual operation and is presented as exemplary of the results to be obtained by practicing the present invention utilizing the apparatus herein disclosed.

EXAMPLE

A furnace as disclosed was operated under the following conditions. Melter bottom cooling using 1.8 gal/min was employed.

Depth of glass over well: 9"
Depth of glass over the bushing: 16"
Glass pull (average): 50 lbs/hr A temperature profile was determined by measurements taken by thermocouples immersed through the batch layer to the indicated depth within the furnace as it was operating. Measurements were taken consecutively on the furnace centerline and at either end near the end wall. The feeding of particulate batch was interrupted during electrode insertion, temperature measurement and electrode removal. The interruption of batch feeding varied the batch thickness from normal which varied the heat loss upwardly through the batch layer as reflected in the temperature measurement at the top region of the furnace, at the 9" level. Further, the temperature measured at the centerline at the 0 level and at the next level were increased because the side wall locations were cooled by the refractory furnace bottom while the centerline location was not so cooled.

The following readings were obtained:

| Distance Above Inlet to Bushing Well (inches) | Measurement Location and Temperature (Degrees F.) | | |
| --- | --- | --- | --- |
| | South End | Centerline | North End |
| 0 | 2604 | 2704 | 2560 |
| 1.5 | 2649 | 2722 | 2640 |
| 3.0 | 2703 | 2731 | 2698 |

| Distance Above Inlet to Bushing | Measurement Location and Temperature (Degrees F.) | | |
| --- | --- | --- | --- |
| Well (inches) | South End | Centerline | North End |
| 4.5 | 2762 | 2738 | 2708 |
| 6.0 | 2817 | 2811 | 2808 |
| 7.5 | 2834 | 2809 | 2824 |
| 9.0 | 2559 | 2723 | 2738 |

The temperature measurements demonstrate:

A. The occurrence of substantially isothermal zones of molten glass occurring at vertically spaced;

B. The progressive cooling of the glass in isothermal zones beneath the electrode level.

Another embodiment for carrying out this invention includes multiple openings in the floor for discharge of molten material therethrough with a forming means disposed at each opening to receive molten material discharged from the vessel.

We claim:

1. An electrically heated melter for forming molten material from particulate batch and discharging at its bottom the molten material directly into a product forming region comprising:

a chamber formed of heat resistant material for holding molten material, the chamber having at least one outlet at its bottom in communication with a product forming region;

each product forming region including a forming means disposed to receive molten material directly discharged from an outlet in the bottom of the chamber;

a first group of spaced apart electrodes located within the chamber;

a second group of spaced apart electrodes located within the chamber;

the electrodes in the first and second groups being arranged in pairs of opposed electrodes in spaced apart relationship wherein each pair of electrodes includes one electrode from the first group and one electrode from the second group; and independent means for controllably supplying electrical current separately to each pair of opposed electrodes to allow the temperature of the molten glass entering the outlets to be adjusted to provide molten material to the outlets with a heat pattern which will optimize forming performance, said melter creating an essentially isothermal condition across a given horizontal plane of the body of molten material.

2. An electrically heated melter according to claim 1 wherein the separate means for supplying electric current is a separate transformer associated with each pair of opposed electrodes.

3. An electrically heated melter according to claim 2 including a separate SCR power controller associated with each pair of opposed electrodes and its transformer.

4. An electrically heated melter according to claim 1 including multiple openings in the floor for discharge of molten material therethrough with a forming means disposed at each opening to receive molten material discharged from the vessel.

* * * * *